(12) United States Patent
Yoon (10) Patent No.: US 7,825,818 B2
(45) Date of Patent: Nov. 2, 2010

(54) BROADCAST RECEIVER AND METHOD OF CONTROLLING THE SAME

(75) Inventor: Sang Mi Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 448 days.

(21) Appl. No.: 11/924,383

(22) Filed: Oct. 25, 2007

(65) Prior Publication Data

US 2008/0129521 A1    Jun. 5, 2008

(30) Foreign Application Priority Data

Oct. 27, 2006    (KR) .................... 10-2006-0104883

(51) Int. Cl.
*G08B 21/00* (2006.01)
*G06F 3/038* (2006.01)
*G09G 5/00* (2006.01)

(52) U.S. Cl. .............. 340/636.1; 340/636.19; 345/211

(58) Field of Classification Search . 340/636.1–636.21; 429/90; 324/433
See application file for complete search history.

(56) References Cited

U.S. PATENT DOCUMENTS

| | | | | |
|---|---|---|---|---|
| 5,278,509 A | * | 1/1994 | Haynes et al. .............. 324/427 |
| 5,838,140 A | * | 11/1998 | Rosenthal ................... 320/133 |
| 6,677,860 B2 | * | 1/2004 | DelRossi et al. .......... 340/636.1 |
| 6,717,520 B1 | * | 4/2004 | Dorenbosch ............. 340/636.1 |
| 6,910,139 B2 | * | 6/2005 | Ishidera ..................... 713/320 |
| 6,967,647 B2 | * | 11/2005 | Nokiyama .................. 345/204 |
| 7,088,355 B1 | * | 8/2006 | Ochi .......................... 345/211 |
| 7,142,204 B2 | * | 11/2006 | Shiotsu et al. .............. 345/211 |
| 2006/0262111 A1 | * | 11/2006 | Kerofsky ..................... 345/211 |
| 2009/0043496 A1 | * | 2/2009 | Koga et al. .................. 701/209 |

FOREIGN PATENT DOCUMENTS

| | | |
|---|---|---|
| JP | 2003-283958 A | 10/2003 |
| WO | WO-2006/129443 A1 | 1/2006 |

\* cited by examiner

*Primary Examiner*—Jennifer Mehmood
(74) *Attorney, Agent, or Firm*—Birch, Stewart, Kolasch & Birch, LLP (57) ABSTRACT

A broadcast receiver which outputs a warning signal when the amount of remaining battery power is insufficient to perform a scheduled operation of a broadcast program, and a method of controlling an operation of the broadcast receiver, are discussed. According to an embodiment, the method includes identifying broadcast information of a predetermined broadcast program; detecting an amount of remaining power of a battery of the broadcast receiver; determining if the remaining battery power is sufficient to perform a scheduled operation for the predetermined broadcast program based on the broadcast information and the detected remaining battery power; and outputting a warning signal if the determining determines that the remaining battery power is insufficient to perform the scheduled operation.

24 Claims, 7 Drawing Sheets

BROADCAST RECEIVER AND METHOD OF CONTROLLING THE SAME

This application claims the priority benefit of Korean Patent Application No. 10-2006-104883, filed on Oct. 27, 2006, the disclosure of which is incorporated herein by reference.

BACKGROUND OF THE INVENTION

1. Field of the Invention

The present invention relates to a broadcast receiver which outputs a warning signal when the amount of remaining power of a battery is insufficient to perform a scheduled broadcast reception function that is set in advance.

2. Description of the Related Art

Digital multimedia broadcasting (DMB) includes digital video and audio broadcasting technology that enables a user to watch a broadcast program while moving from place to place and broadcast services that are provided using the digital video and audio broadcasting technology. Originally, DMB has been developed for the existing terrestrial analog radio broadcasting. However, recent developments in DMB technology have enabled the transmission of not only audio data but also digital versatile disc (DVD)-quality moving image data. DMB is classified into terrestrial-DMB (T-DMB) and satellite-DMB (S-DMB) according to the type of radio transmission/reception. In recent years, research has been vigorously conducted to develop ways to provide bilateral DMB data services.

Examples of broadcast receivers capable of receiving multimedia broadcast data and executing the multimedia broadcast data include DMB phones integrated with mobile phones, personal portable devices with no communication function, and set-top boxes for vehicles.

With the distribution of such broadcast receivers and the commercialization of various terrestrial DMB services, users can nowadays enjoy a variety of contents such as music, text data, and video/audio data anytime anywhere.

However, typical broadcast receivers simply display the amount of remaining power of a battery that supplies operating power and do not provide any information indicating whether the amount of remaining battery power is sufficient to perform a scheduled broadcast reception function (e.g., scheduled viewing or scheduled recording) for a desired broadcast program.

Therefore, users are unable to determine in advance whether they need to charge their broadcast receivers for a scheduled reception of a desired broadcast program. Thus, the scheduled viewing or scheduled recording of a broadcast program may not be properly performed or may be terminated due to, for example, a battery discharge.

SUMMARY OF THE INVENTION

The present invention provides a broadcast receiver which can thus allow a user to take appropriate measures to handle a battery power shortage by outputting a warning signal when the amount of remaining battery power is insufficient to perform a scheduled broadcast reception function, and provides a method of controlling all operation of the broadcast receiver.

The present invention is directed to a broadcast receiver such as a mobile terminal and a method of controlling the broadcast receiver, which address the limitations and disadvantages associated with the related art.

According to an aspect of the present invention, there is provided a method of controlling an operation of a broadcast receiver, the method including identifying a broadcast time of a predetermined broadcast program; detecting an amount of remaining power of a battery that supplies operating power; and comparing an amount of time for which the broadcast receiver can be driven with the remaining battery power with the broadcast time of the predetermined broadcast program and, if the result of the comparison indicates that the remaining battery power is insufficient to perform a scheduled recording of the predetermined broadcast program, outputting a warning signal.

According to another aspect of the present invention, there is provided a method of controlling an operation of a broadcast receiver, the method including setting a scheduled reception of a broadcast program; detecting, at regular intervals of time, an amount of remaining power of a battery that supplies operating power; and comparing an amount of time for which the broadcast receiver can be driven with the remaining battery power with the broadcast time of the predetermined broadcast program and, if the result of the comparison indicates that the remaining battery power is insufficient to perform the scheduled recording of the predetermined broadcast program, outputting a warning signal.

According to an aspect of the present invention, there is provided a broadcast receiver including a remaining battery power detection unit which detects an amount of remaining power of a battery that supplies operating power; and a control unit which identifies a broadcast time of a predetermined broadcast program, compares an amount of time for which the broadcast receiver can be driven with the remaining battery power with the broadcast time of the predetermined broadcast program and, if the result of the comparison indicates that the remaining battery power is insufficient to perform a scheduled recording of the predetermined broadcast program, outputs a warning signal.

According to another embodiment, the present invention provides a method of controlling an operation of a broadcast receiver, the method comprising: identifying broadcast information of a predetermined broadcast program; detecting an amount of remaining power of a battery of the broadcast receiver; determining if the remaining battery power is sufficient to perform a scheduled operation for the predetermined broadcast program based on the broadcast information and the detected remaining battery power; and outputting a warning signal if the determining determines that the remaining battery power is insufficient to perform the scheduled operation.

According to another embodiment, the present invention provides a method of controlling an operation of a broadcast receiver, the method comprising: setting a scheduled recording of a broadcast program; detecting, at regular intervals of time, an amount of remaining power of a battery that supplies operating power; and comparing an amount of time for which the broadcast receiver can be driven with the remaining battery power, with broadcast time information of the predetermined broadcast program and, if the result of the comparison indicates that the remaining battery power is insufficient to perform the scheduled recording of the predetermined broadcast program, outputting a warning signal.

According to another embodiment, the present invention provides a broadcast receiver comprising: a remaining battery power detection unit which detects an amount of remaining power of a battery that supplies operating power; and a control unit which identifies broadcast information of a predetermined program, determines if the remaining battery power is sufficient to perform a scheduled operation of the predetermined broadcast program based on the detected remaining battery power and the broadcast information, and outputs a warning signal if the control unit determines that the remaining battery power is insufficient to perform the scheduled operation.

BRIEF DESCRIPTION OF TEE DRAWINGS

The above and other features and advantages of the present invention will become more apparent by describing in detail preferred embodiments thereof with reference to the attached drawings in which.

DETAILED DESCRIPTION OF THE PREFERRED EMBODIMENTS

Preferred embodiments of the present invention will hereinafter be described in detail, as examples only, with reference to the accompanying drawings in which exemplary embodiments of the invention are shown.

A method of controlling a broadcast receiver according to an embodiment of the present invention can be applied to a digital multimedia broadcasting (DMB) environment using Binary Format for Scene (BIFS), but the present invention is not restricted to this. In other words, the present invention may be applied to various broadcast environments, other than a DMB environment using BIFS.

Figure 1:
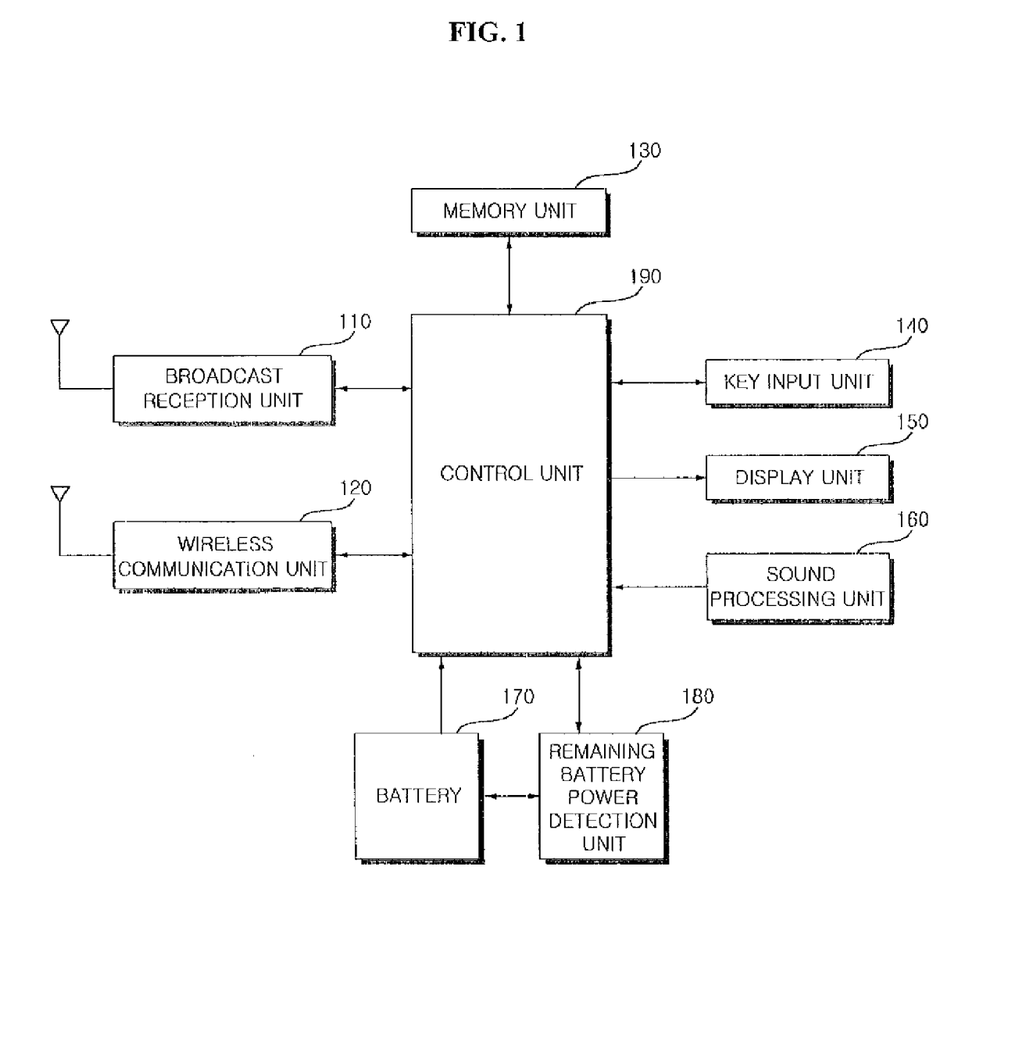
FIG. 1 is a block diagram of a broadcast receiver according to an embodiment of the present invention.

FIG. 1 is a block diagram of a broadcast receiver according to an embodiment of the present invention. Referring to FIG. 1, the broadcast receiver has a mobile communication function. For instance, the broadcast receiver can be or can be included in a mobile communication device such as a mobile phone, a smart device, a MP3 player, a computer laptop, etc. The broadcast receiver includes a broadcast reception unit 110, a wireless communication unit 120, a memory unit 130, a key input unit 140, a display unit 150, a sound processing unit 160, a battery 170, a remaining battery power detection unit 180, and a control unit 190. The broadcast receiver can include other components, and all components of the broadcast receiver are operatively coupled and configured.

The broadcast reception unit 110 receives a broadcast signal such as a DMB signal from a channel selected by a user, and performs a number of processes such as demodulation on the DMB signal, thereby generating a transport stream (TS). Then, the broadcast reception unit 110 divides the TS into a number of element streams, including video, audio, and data information, and decodes the element streams separately from one another, thereby generating a broadcast signal that can be played back. The broadcast reception unit 110 may include an electronic program guide (EPG) decoder. In this case, the broadcast reception unit 110 may extract EPG information which is transmitted thereto via an EPG service, and transmit the EPG information to the control unit 190.

The wireless communication unit 120 provides an interface for wireless communication with a base station through an antenna. Further, the wireless communication unit 120 can include a duplex filter for filtering a signal received through an antenna, a power amplifier for amplifying a transmission signal, a frequency tip-convert circuit in a transmission path, a frequency down-convert circuit in a reception path, etc.

The memory unit (or storage unit) 130 may include a read only memory (ROM), a random access memory (RAM), or a flash memory, or other type of storage unit. The memory unit 130 stores programs and data necessary for the operation of the broadcast receiver such as the mobile communication device and various other data that the user wishes to store in the memory unit 130. The memory unit 130 may store data corresponding to a signal output by the broadcast reception unit 110, and may thus store any desired broadcast program. The key input unit 140 may comprise a plurality of keys, including number keys and function keys, buttons, a keypad, etc. The key input unit 140 transmits a signal corresponding to a key selected by the user to the control unit 190 and thus receives an operation command and data from the user.

The display unit 150 may include one or more display screens. Such a screen can be a liquid crystal display (LCD), a PDP, a CRT, etc. The display unit 150 may display a menu for controlling an operation of the broadcast receiver, information regarding a state of a received broadcast signal, battery information, and information regarding an operating state of the broadcast receiver that varies in response to a command input by the user, and may play back a broadcast program desired by the user. The sound processing unit 160 may amplify a sound signal output by the control unit 190 and output the amplified sound signal via, for example, speakers. In addition, the sound processing unit 160 may convert a sound signal input via, for example, a microphone, into an electrical signal and transmit the electrical signal to the control unit 190.

The battery 170 supplies operating power to the broadcast receiver, and may be charged using an external battery charger. The remaining battery power detection unit 180 determines the degree to which the battery 170 is charged and the amount of remaining power of the battery 170, and transmits remaining battery power information based on the results of the determination to the control unit 190. The remaining battery power detection unit 180 measures various parameters of the battery 170 such as the charge, discharge, or self-discharge of the battery 170 and the temperature of the battery 170. The remaining battery power detection unit 180 may include an auto-calibration voltage-to-frequency converter (VFC) for integrating continuous charge and discharge functions, and may thus be able to measure the parameters of the battery 170 with high precision under various operating conditions for the battery 170.

The control unit 190 controls the operations of the broadcast reception unit 110, the wireless communication unit 120, the memory unit 130, the key input unit 140, the display unit 150, the sound processing unit 160, the battery 170, and the remaining battery power detection unit 180. More specifically, the control unit 190 controls the display unit 150 to display a signal output by the broadcast reception unit 110. If the user sets a scheduled broadcast reception function for a predetermined broadcast program using the key input unit 140, the control unit 190 calculates the amount of the remaining power of the battery 170 based on the remaining battery power information transmitted by the remaining battery power detection unit 180, and estimates the remaining operating time and the standby time of the broadcast receiver. If the amount of the remaining power of the battery 170 is insufficient to perform a scheduled broadcast reception function for a predetermined broadcast program, the control unit 190 controls the display unit 150 to output a warning message or an alarm sound to alert the user.

Figure 2A:
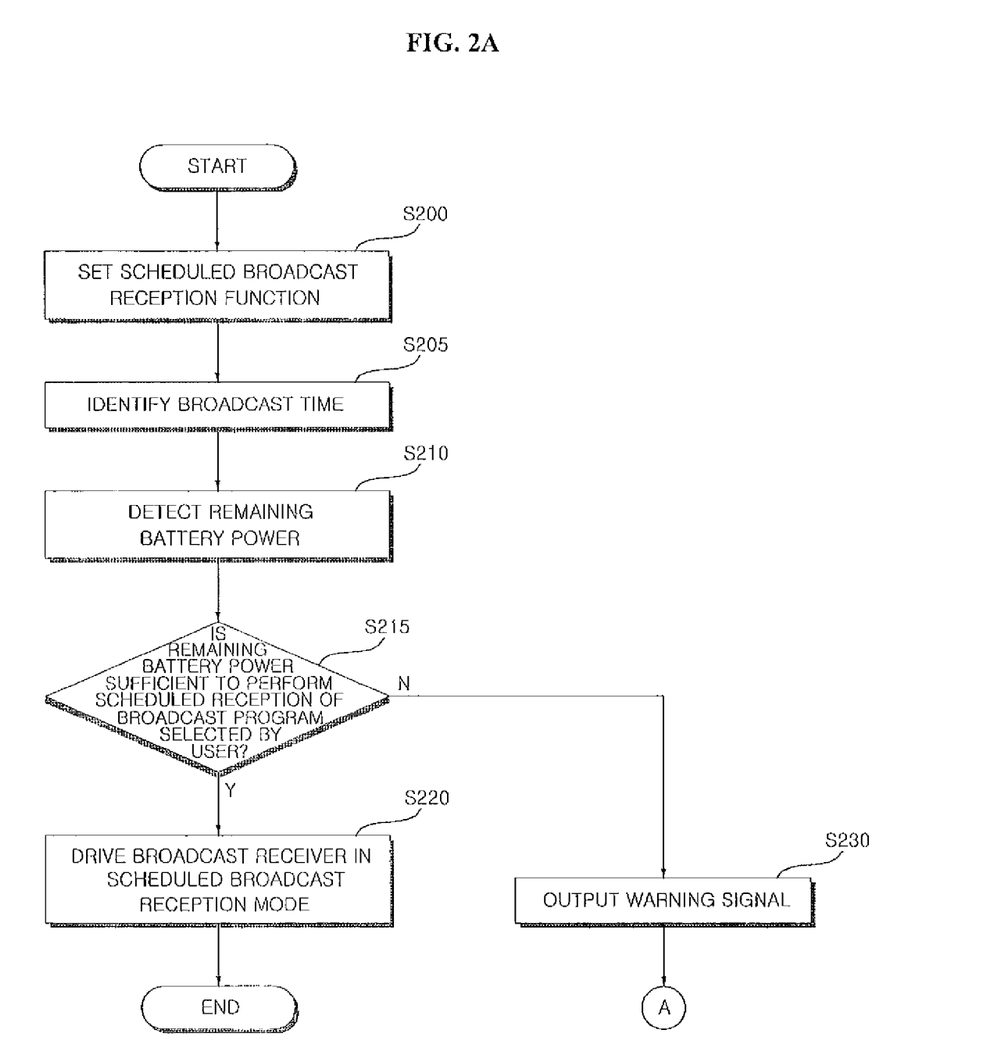
FIGS. 2A through 2C are flowcharts illustrating a method of controlling an operation of a broadcast receiver according to all embodiment of the present invention.
Figure 2B:
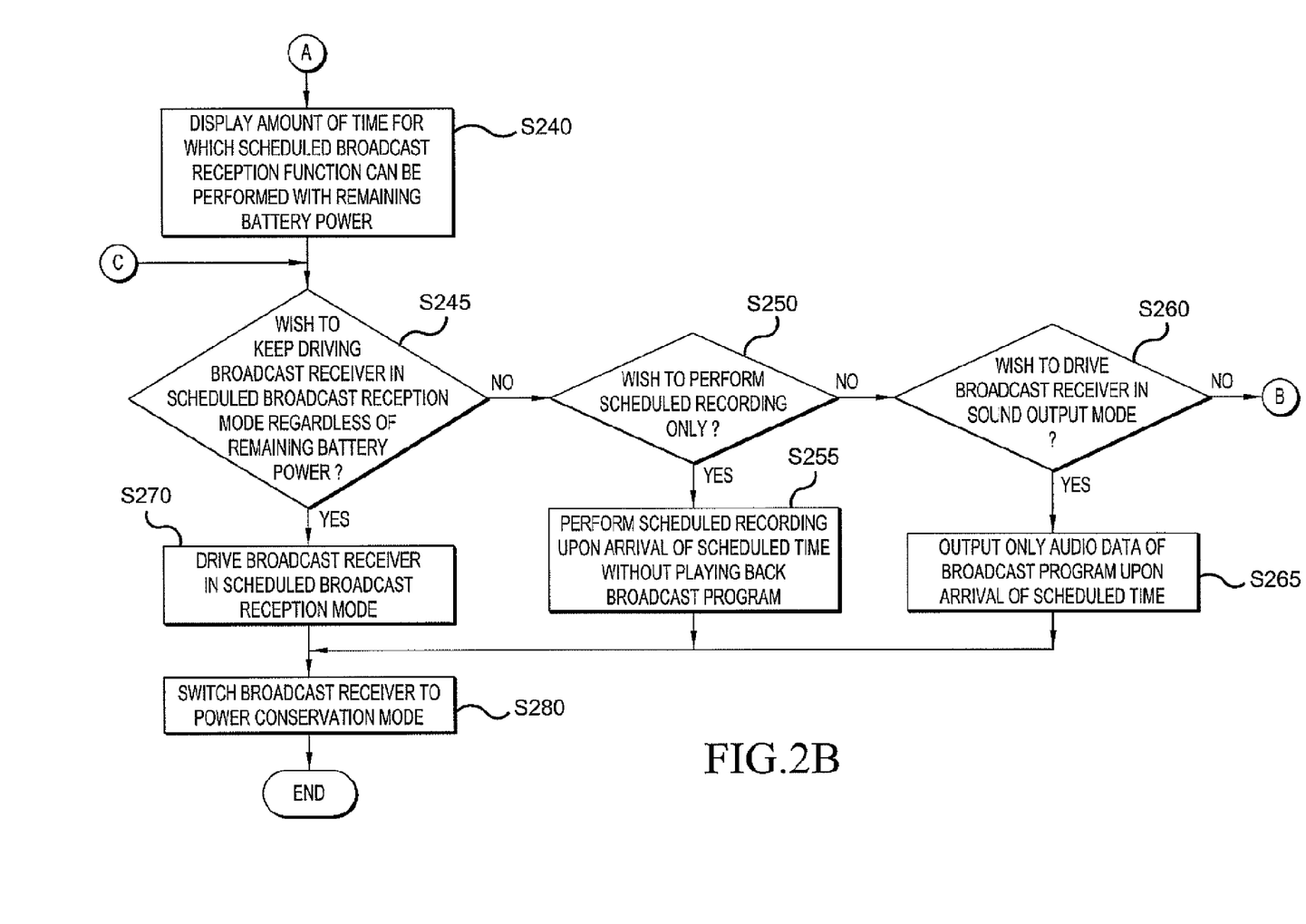
Figure 2C:
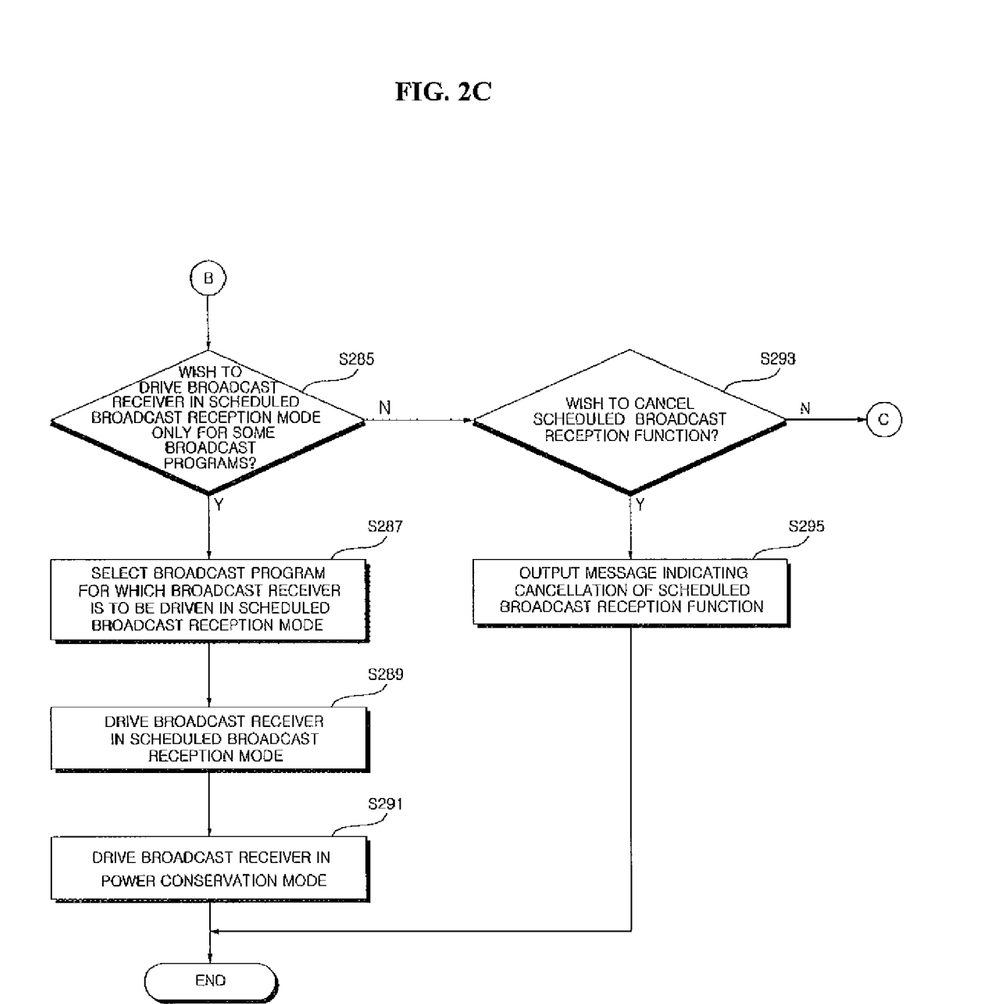
Figure 3A:
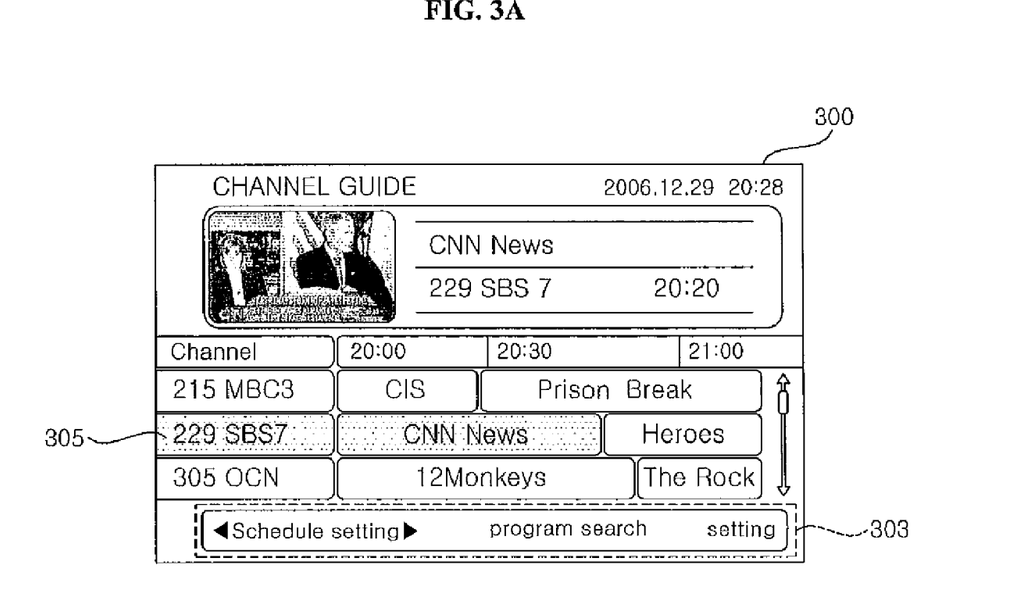
FIGS. 3A and 3B illustrate examples of screen images for explaining the method illustrated in FIGS. 2A through 2C.
Figure 3B:
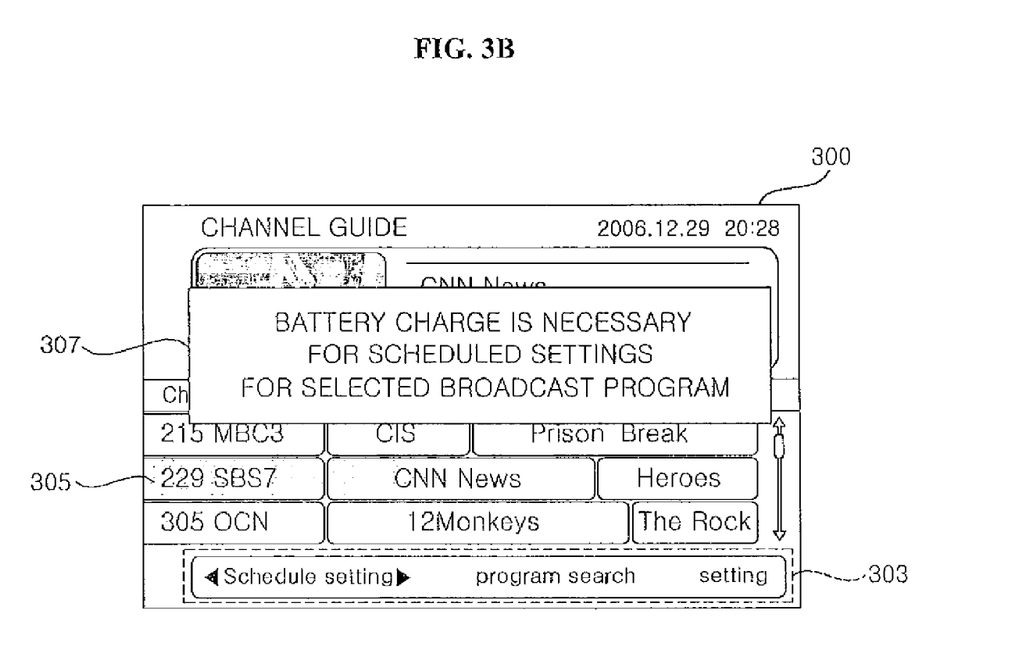

FIGS. 2A through 2C are flowcharts illustrating a method of controlling an operation of a broadcast receiver according to an embodiment of the present invention, and FIGS. 3A and 3B illustrate examples of screen images for explaining the method illustrated in FIGS. 2A through 2C.

Referring to FIG. 2A, in operation S200, a user sets a scheduled broadcast reception function (e.g., a scheduled viewing and/or scheduled recording) for one or more predetermined broadcast programs by using the key input unit 140. In operation S205, the control unit 190 identifies the start time (e.g., scheduled broadcast time) of the predetermined broadcast program by referring to EPG information, which is received by the broadcast reception unit 110 and then is stored in the memory unit 130.

The EPG information includes information regarding broadcast programs currently being broadcast or to be broadcast such as the titles, synopses, and broadcast times (e.g., start time, end time, length, etc.) of broadcast programs. Also, the EPG information provides a number of functions such as scheduled recording and scheduled viewing. Therefore, the user may set a scheduled broadcast reception function for any desired broadcast program using an EPG screen. In other words, if the user sets the scheduled broadcast reception function for a designated or predetermined broadcast program using an EPG screen, the broadcast receiver may be automatically switched to a channel that broadcasts the predetermined broadcast program at a scheduled time, and may receive a broadcast signal regarding the predetermined broadcast program from the channel.

In operation S210, once the start time of the predetermined broadcast program is identified from the EPG information, the control unit 190 receives the remaining battery power information regarding the amount of the remaining power of the battery 170 from the remaining battery power detection unit 180. Thereafter, in operation S215, the control unit 190 estimates the remaining operating time of the broadcast receiver based on the remaining battery power information, and compares the estimated remaining operating time of the broadcast receiver with the start time of the predetermined broadcast program and/or with other information pertaining to the predetermined broadcast program. For instance, the control unit 190 can compare the estimated remaining operating time of the broadcast receiver with the scheduled broadcast time as well as the broadcast length of the predetermined broadcast program to determine if there is sufficient power to perform a scheduled broadcast reception function (e.g., recording and/or reproducing) on the broadcast program.

In one example, in operation S215, the control unit 190 determines whether the amount of the remaining power of the battery 170 is sufficient to perform a scheduled broadcast reception function for the predetermined broadcast program, based on one or more factors such as the result of the comparison of the estimated remaining operating time of the broadcast receiver with the start time of the predetermined broadcast program, the amount of power expected to be consumed by the broadcast receiver until the start of the predetermined broadcast program, and the amount of power generally required to perform the scheduled broadcast reception function (e.g., scheduled viewing and/or scheduled recording). Further, the length (duration) of the predetermined broadcast program can also be considered in making this determination.

In operation S220, if it is determined in operation S215 that the amount of remaining power of the battery 170 is sufficient to perform the scheduled broadcast reception function for the predetermined broadcast program, the control unit 190 places the broadcast receiver to operate in a scheduled broadcast reception mode so that the scheduled viewing and/or scheduled recording of the predetermined broadcast program can be performed.

In operation S230, if it is determined in operation S215 that the amount of remaining power of the battery 170 is insufficient to perform the scheduled broadcast reception function for the predetermined broadcast program, the control unit 190 outputs a warning signal to the user through the display unit 150 or some other way. The warning signal may be an alarm sound and/or a warning message indicating that the amount of remaining power of the battery 170 is insufficient to perform the scheduled broadcast reception function for the predetermined broadcast program. The warning message can be output audibly and/or visually. When the warning signal is output, the user may take appropriate measures such as charging the battery 170 or canceling or modifying the scheduled broadcast reception function.

Referring to FIG. 2B, in operation S240 (after operation S230 in FIG. 2A), the control unit 190 displays information indicating the amount of time for which the predetermined broadcast program can be scheduled-recorded or scheduled-viewed (or both if that was the scheduled function) with the remaining power of the battery 170. For example, if the predetermined broadcast program is one hour long and the scheduled recording or the scheduled viewing of the predetermined broadcast program can be performed only for ten minutes with the remaining power of the battery 170, the control unit 190 may display or output this information to the user, i.e., information indicating the amount of time for which the scheduled recording or the scheduled viewing of the predetermined broadcast program can be performed with the remaining power of the battery 170. Then, in operation S245, the user may decide whether to keep driving the broadcast receiver in the scheduled broadcast reception mode.

In operation S270, if the user wishes to keep driving the broadcast receiver in the scheduled broadcast reception mode even though the amount of remaining power of the battery 170 is insufficient to perform the scheduled broadcast reception function for the predetermined broadcast program, the control unit 190 sets a scheduled broadcast mode. Thereafter, in operation S280, the control unit 190 switches the broadcast receiver to a power conservation mode so that the power consumption of the broadcast receiver can be minimized while the scheduled broadcast reception function is performed.

On the other hand, if it is determined in operation S245 that the user does not wish to keep driving the broadcast receiver in the scheduled broadcast reception mode even though the amount of remaining power of the battery 170 is insufficient to perform the scheduled broadcast reception function for the predetermined broadcast program, then the control unit 190 determines in operation S250 if the user wishes to perform only a scheduled recording of the broadcast program. This determination can be made based on stored data or other data. For instance, the user can be asked if the user wishes to perform only the scheduled recording of the broadcast program in view of the warning signal of operation S230. In operation S255, if the user wishes to perform only the scheduled recording of the predetermined broadcast program, the control unit 190 controls appropriate components (e.g., recording unit) of the broadcast receiver to perform the scheduled recording function on the broadcast program. As a result, the predetermined broadcast program is stored in the memory unit 130 upon arrival of its scheduled time, instead of being played back by the display unit 150, and the method proceeds to operation S280. In this manner, it is possible to reduce the power consumption by the display unit 150. Thus, the user can store many broadcast programs even with a limited battery power, and play back the stored broadcast programs later after charging the battery 170.

If the control unit 190 determines in operation S250 that the user does not wish to perform only the scheduled recording of the broadcast program, then in operation S260, the user decides whether to drive the broadcast receiver in a sound output mode for minimizing the power consumption of the broadcast receiver. This determination can be made by the control unit 190 based on the stored data or other data, e.g., additional user input. For instance, the user can be asked if the user wishes to drive the broadcast receiver in a sound output mode for minimizing the power consumption of the broadcast receiver. In operation S265, if the user decides to drive the broadcast receiver in the sound output mode in operation S260, the control unit 190 controls only audio data of the predetermined broadcast program so that the broadcast program is output only audibly upon arrival of the scheduled time, and the method proceeds to operation S280.

Referring to FIG. 2C, even if a scheduled reception function is set for a plurality of broadcast programs, the broadcast receiver may be set to operate in the scheduled broadcast reception mode only for some of the broadcast programs. More specifically, in operation S285, it is determined whether to drive the broadcast receiver in the scheduled broadcast reception mode only for some broadcast programs. In operation S287, if it is determined in operation S285 to drive the broadcast receiver in the scheduled broadcast reception mode only for some broadcast programs, one or more broadcast programs for which the broadcast receiver is to operate in the scheduled broadcast reception mode, are selected. As an example, this selection can be made by the user or by the control unit 190. For instance, a menu or message may be displayed on the screen to the user, which asks to select certain program(s) from the list of broadcast programs previously selected by the user for the scheduled broadcast reception function. In another example, the control unit 190 can determine which broadcast program(s) should be selected based on the length of the broadcast programs and the remaining battery power information, etc. and then notify the result to the user.

In operation S289, the broadcast receiver is set to operate in the scheduled broadcast reception mode for the selected broadcast program(s). In operation S291, the broadcast receiver is switched to the power conservation mode so that the power consumption of the broadcast receiver can be minimized until the arrival of the scheduled time.

In operation S293, if it is determined in operation S285 not to drive the broadcast receiver in the scheduled broadcast reception mode because of the battery power shortage, it is determined whether to cancel the scheduled broadcast reception function. In operation S295, if it is determined in operation S293 to cancel the scheduled broadcast reception function, the scheduled broadcast reception function is canceled, and a message indicating the cancellation of the scheduled broadcast function is output. Otherwise, the method proceeds to 'C' (step S245) in FIG. 2B.

FIG. 3A illustrates one example of an EPG screen 300, which can be displayed on the display unit 150. Referring to FIG. 3A, reference numeral 303 indicates menu items for searching for a broadcast program, setting a scheduled reception function, and performing various menu settings using the EPG screen 300. By using the menu items 303, it is possible to schedule the reception of any desired broadcast program, e.g., for setting the scheduled viewing and/or recording of any desired broadcast program. Reference numeral 305 indicates a broadcast program scheduled to be received. Referring to FIG. 3B, if the amount of remaining battery power is determined to be insufficient to perform a scheduled reception of the broadcast program 305, a warning message 307 indicating a battery power shortage may be output as a popup window. The warning message 307 may be output in various manners, other than that set forth herein. For example, the warning message 307 may be output along with a warning sound. Other messages pertaining to the operations of FIGS. 2A-2C may also be output to the user on the screen.

Figure 4:
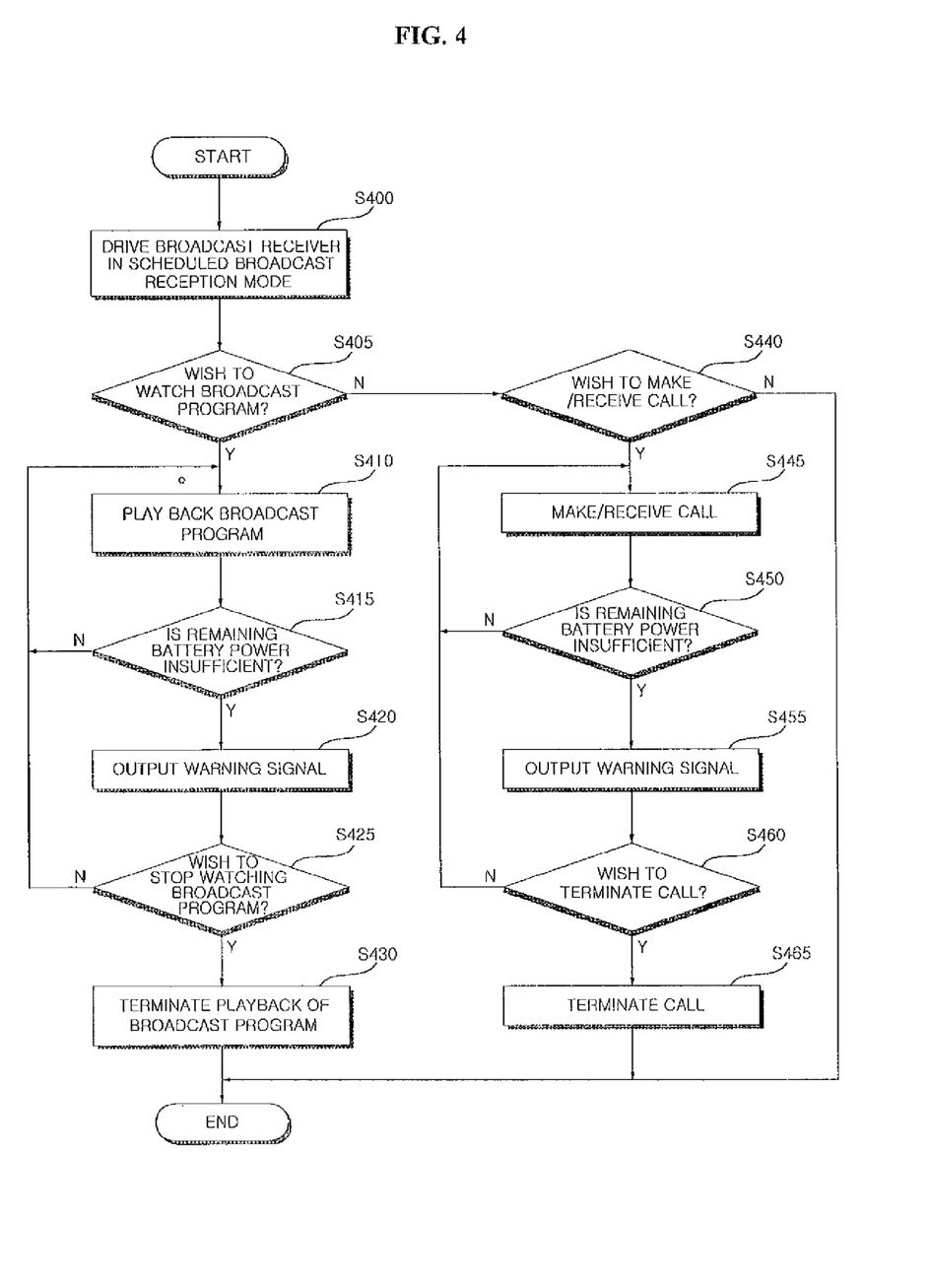
FIG. 4 is a flowchart illustrating a method of controlling an operation of a broadcast receiver according to another embodiment of the present invention.

FIG. 4 is a flowchart of a method of controlling an operation of a broadcast receiver according to another embodiment of the present invention. More specifically. FIG. 4 illustrates the situations when the amount of remaining battery power of the broadcast receiver of FIG. 1 varies when the broadcast receiver operates in a scheduled broadcast reception mode. Referring to FIG. 4, the broadcast receiver operates in a scheduled broadcast reception mode (S400). The control unit 190 plays back a predetermined broadcast program desired by a user (S410) at the request of the user (S405). Thereafter, the control unit 190 periodically detects the amount of remaining battery power of the broadcast receiver during the playback of the predetermined broadcast program. If the result of the detection indicates that the amount of the remaining battery power is insufficient to perform a scheduled reception of the predetermined broadcast program (S415), the control unit 190 outputs a warning signal (S420).

In general, a broadcast receiver consumes much more power when playing back a broadcast program than when being in a standby mode. Thus, even if the amount of the remaining battery power initially appears to be sufficient to perform a scheduled reception of a broadcast program, the broadcast receiver may later suffer from the battery power shortage after consuming power in playing back the broadcast program.

If the user wishes to stop viewing the predetermined broadcast program (S425) for various reasons, the playback of the predetermined broadcast program is terminated (S430). On the other hand, if the user wishes to keep watching the predetermined broadcast program (S425), the playback of the predetermined broadcast program continues, and the method returns to operation S410.

If it is determined at operation S405 that the user does not wish to view the broadcast program, then if the broadcast receiver provides a mobile communication function and the user wishes to make/receive a call using the broadcast receiver (S440), the control unit 190 makes/receives the call using the wireless communication unit 120 upon the request of the user (S445). Thereafter, if it is determined that the amount of the remaining battery power is insufficient to perform a scheduled reception of the predetermined broadcast program and/or to continue with the call (S450), the control unit 190 outputs a warning signal visually and/or audibly (S455). For instance, in some situations, the user may not be able to view the warning message from the display unit 150 during the call. Thus, the control unit 190 may output a voice signal as the warning signal. If the user wishes to terminate the call (S460), the control unit 190 terminates the call (S465). On the other hand, if the user wishes not to terminate the call regardless of the warning signal, the method returns to operation S445.

In short, if the amount of reaming battery power of the broadcast receiver is insufficient to perform a scheduled reception of a broadcast program because the broadcast receiver has consumed a considerable amount of battery power in playing back a broadcast program or making/receiving a call in the scheduled broadcast reception mode, the control unit 190 may output a warning signal so that the user can take appropriate measures to handle the battery power shortage, e.g., by recharging the battery. The control unit 190 may also output a warning signal if the amount of remaining battery power of the broadcast receiver is insufficient to perform a scheduled reception of a broadcast program because the broadcast receiver has consumed power in performing a multitask operation or other operations.

As described above, according to the examples of the present invention, a warning signal is output specifically when the amount of remaining battery power is insufficient to perform a scheduled broadcast reception function which is set in advance by a user. As a result, the user (or the broadcast receiver) can take appropriate measures to handle the battery power shortage as needed.

In addition, according to the examples of the present invention, the amount of time for which the scheduled broadcast reception function can be performed with a current remaining battery power is displayed or otherwise notified to the user. Further a broadcast receiver is driven in a power conservation mode so that the broadcast receiver can store a broadcast program, instead of playing back the broadcast program, or can output only audio data of the broadcast program upon arrival of a scheduled time. As a result, it is possible to perform as many functions regarding the scheduled reception of a broadcast program as possible with the limited battery power.

Moreover, according to the examples of the present invention, a warning signal is also output when the amount of remaining battery power of a broadcast receiver is insufficient to perform a scheduled reception of a broadcast program because the broadcast receiver has already consumed a considerable amount of battery power in making/receiving a call and/or playing back a broadcast program. Therefore, it is possible to improve user convenience by preventing the scheduled viewing and/or scheduled recording of a broadcast program desired by the user from being improperly performed or being terminated due to the battery power shortage.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling an operation of a broadcast receiver, the method comprising:
    identifying broadcast information of a predetermined broadcast program;
    detecting an amount of remaining power of a battery of the broadcast receiver;
    determining if the remaining battery power is sufficient to perform a scheduled operation for the predetermined broadcast program based on the broadcast information and the detected remaining battery power;
    outputting a warning signal if the determining determines that the remaining battery power is insufficient to perform the scheduled operation; and
    after the outputting, scheduling a reception of the predetermined broadcast program in a sound output mode, and outputting only audio data of the predetermined broadcast program upon arrival of a scheduled time without playing back video data of the predetermined broadcast program.

2. The method of claim 1, wherein the identifying comprises identifying a broadcast time of the predetermined broadcast program with reference to electronic program guide (EPG) information.

3. The method of claim 1, wherein the outputting the warning signal comprises outputting the warning signal as an on-screen display (OSD) message, a warning sound, or both.

4. The method of claim 1, further comprising:
    after the outputting, displaying an amount of time for which the scheduled reception of the predetermined broadcast program can be performed with the remaining battery power.

5. The method of claim 1, wherein the warning signal comprises a recommendation message recommending that the predetermined broadcast program be stored.

6. The method of claim 5, further comprising:
    scheduling the reception of the predetermined broadcast program according to the recommendation message and storing the predetermined broadcast program upon the arrival of the scheduled time without playing back the predetermined broadcast program.

7. The method of claim 1, further comprising:
    after the outputting, placing the broadcast receiver in a power conservation mode, and controlling the broadcast receiver to perform operations in the power conservation mode.

8. The method of claim 1, wherein the determining comprises comparing an amount of time for which the broadcast receiver can be driven with the remaining battery power, with a broadcast time of the predetermined broadcast program.

9. The method of claim 8, further comprising:
    if the result of the comparison indicates that the remaining battery power is sufficient to perform the scheduled operation of the predetermined broadcast program, scheduling the reception of the predetermined broadcast program.

10. The method of claim 1, wherein the scheduled operation includes at least one of recording and playing back the predetermined broadcast program.

11. The method of claim 1, further comprising:
    receiving a broadcast signal including EPG (electronic program guide) information;
    extracting the EPG information from the broadcast signal; and
    storing the EPG information,
    wherein the broadcast information of the predetermined broadcast program is identified using the EPG information.

12. The method of claim 1, wherein the predetermined broadcast program is a digital multimedia broadcasting (DMB) program.

13. A method of controlling an operation of a broadcast receiver, the method comprising:
    setting a scheduled recording of a broadcast program;
    detecting, at regular intervals of time, an amount of remaining power of a battery that supplies operating power;
    comparing an amount of time for which the broadcast receiver can be driven with the remaining battery power, with broadcast time information of the predetermined broadcast program and, if the result of the comparison indicates that the remaining battery power is insufficient to perform the scheduled recording of the predetermined broadcast program, outputting a warning signal;
    after the outputting, scheduling a reception of the predetermined broadcast program in a sound output mode, and outputting only audio data of the predetermined broadcast program upon arrival of a scheduled time without playing back video data of the predetermined broadcast program; and performing at least one of the canceling the scheduled recording, the setting the scheduled recording, and controlling only audio data of the broadcast program to be output upon arrival of the scheduled time according to user's decision.

14. The method of claim 13, further comprising:

identifying a broadcast time of the predetermined broadcast program with reference to EPG information, wherein the identified broadcast time is used as part of the broadcast time information in the comparing step.

15. The method of claim 13, wherein the outputting the warning signal comprises outputting the warning signal as an OSD message, a warning sound, or both.

16. A broadcast receiver comprising:

a remaining battery power detection unit which detects an amount of remaining power of a battery that supplies operating power; and a control unit which identifies broadcast information of a predetermined broadcast program, determines if the remaining battery power is sufficient to perform a scheduled operation of the predetermined broadcast program based on the detected remaining battery power and the broadcast information, outputs a warning signal if the control unit determines that the remaining battery power is insufficient to perform the scheduled operation, and after the outputting, schedules a reception of the predetermined broadcast program in a sound output mode, and outputs only audio data of the predetermined broadcast program upon arrival of a scheduled time without playing back video data of the predetermined broadcast program.

17. The broadcast receiver of claim 16, wherein the control unit identifies a broadcast time of the predetermined broadcast program with reference to EPG (electronic program guide) information, and uses the identified broadcast time, as part of the broadcast information, to determine if the remaining battery power is sufficient to perform the scheduled operation of the predetermined broadcast program.

18. The broadcast receiver of claim 16, wherein the control unit compares an amount of time for which the broadcast receiver can be driven with the remaining battery power, with a broadcast time of the predetermined broadcast program to determine if the remaining battery power is sufficient to perform the scheduled operation, and, if the result of the comparison indicates that the remaining battery power is sufficient to perform the scheduled operation of the broadcast program, the control unit enables the scheduled reception of the predetermined broadcast program.

19. The broadcast receiver of claim 16, further comprising:

an input unit which receives a command for choosing the predetermined broadcast program; and a storage unit which stores EPG (electronic program guide) information.

20. The broadcast receiver of claim 16, further comprising at least one of the following:

a display unit which displays a message corresponding to the warning signal; or a sound signal processing unit which outputs a sound signal corresponding to the warning signal.

21. The broadcast receiver of claim 16, wherein the scheduled operation of the predetermined broadcast program includes at least one of recording and playing back the predetermined broadcast program.

22. The broadcast receiver of claim 16, further comprising:

a broadcast reception unit which receives a broadcast signal from a channel selected by a user and generates, based on the broadcast signal, data for playing back the predetermined broadcast program.

23. The broadcast receiver of claim 16, further comprising:

a wireless communication unit which provides a mobile communication function under the control of the control unit.

24. The broadcast receiver of claim 16, wherein the predetermined broadcast program is a DMB program.

\* \* \* \* \*